(12) United States Patent
Bach et al.

(10) Patent No.: US 10,744,816 B2
(45) Date of Patent: Aug. 18, 2020

(54) VEHICLE WHEEL FOR A VEHICLE

(71) Applicant: Daimler AG, Stuttgart (DE)

(72) Inventors: Ronny Bach, Kirchheim am Neckar (DE); Bastian Baudy, Stuttgart (DE); Christian Binder, Friolzheim (DE); Erich Jehle-Graf, Karlsruhe (DE); Martin Konermann, Stuttgart (DE); Volker Meyer, Wolfschlugen (DE); Steffen Reichert, Stuttgart (DE); Andrej Ruckhaberle, Boeblingen (DE); Antonis Schley, Stuttgart (DE); Sylvain Wehnert, Gaertringen (DE)

(73) Assignee: Daimler AG, Stuttgart (DE)

( * ) Notice: Subject to any disclaimer, the term of this patent is extended or adjusted under 35 U.S.C. 154(b) by 247 days.

(21) Appl. No.: 15/755,022

(22) PCT Filed: Jul. 21, 2016

(86) PCT No.: PCT/EP2016/001271
§ 371 (c)(1),
(2) Date: Feb. 23, 2018

(87) PCT Pub. No.: WO2017/032435
PCT Pub. Date: Mar. 2, 2017

(65) Prior Publication Data
US 2018/0281510 A1 Oct. 4, 2018

(30) Foreign Application Priority Data

Aug. 26, 2015 (DE) .................. 10 2015 010 963

(51) Int. Cl.
*B60B 7/00* (2006.01)
*B60B 7/04* (2006.01)
(Continued)

(52) U.S. Cl.
CPC .............. *B60B 7/0066* (2013.01); *B60B 7/04* (2013.01); *B60B 7/06* (2013.01); *B60B 3/10* (2013.01);
(Continued)

(58) Field of Classification Search
CPC ....... B60B 7/00; B60B 7/0026; B60B 7/0066; B60B 7/0073; B60B 7/04
See application file for complete search history.

(56) References Cited

U.S. PATENT DOCUMENTS 4,593,953 A * 6/1986 Baba ..................... B60B 7/00
301/37.101
8,801,107 B2 * 8/2014 Schmid ..................... B60B 3/10
301/37.107

(Continued)

FOREIGN PATENT DOCUMENTS

DE 38 16 415 A1 11/1989
DE 101 61 869 A1 7/2003
(Continued)

OTHER PUBLICATIONS

Machine translation of FR2699453, 1994, 8 pages (Year: 1994).*

(Continued)

*Primary Examiner* — Jason R Bellinger
(74) *Attorney, Agent, or Firm* — Crowell & Moring LLP

(57) ABSTRACT

A vehicle wheel for a vehicle has a plurality of spokes, lamellac, blades, wheel segments or similar which are arranged on an outer side of the vehicle wheel, a kinematic system, via which the contour of the outer side of the vehicle wheel can be changed, and a slide element which is adjustable between an inner position and an outer position. The spokes, lamellae, blades, wheel segments or similar are hinged on the slide element and are adjustable together with the slide element.

8 Claims, 3 Drawing Sheets

(51) Int. Cl.
  *B60B 7/06* (2006.01)
  *B60B 3/10* (2006.01)
(52) U.S. Cl.
  CPC . *B60B 2900/1216* (2013.01); *B60B 2900/572* (2013.01); *Y02T 10/88* (2013.01)

(56) References Cited

U.S. PATENT DOCUMENTS

| | | | |
|---|---|---|---|
| 9,233,575 B2* | 1/2016 | Haase | B60B 7/00 |
| 9,919,555 B2* | 3/2018 | Wippler | B60B 3/007 |
| 2008/0036285 A1 | 2/2008 | Davis et al. | |
| 2014/0175858 A1* | 6/2014 | Platto | B60B 7/00 |
| | | | 301/37.106 |
| 2019/0322128 A1* | 10/2019 | Yen | B60B 7/002 |

FOREIGN PATENT DOCUMENTS

| | | |
|---|---|---|
| EP | 1 319 526 A2 | 6/2003 |
| FR | 2 699 453 A1 | 6/1994 |

OTHER PUBLICATIONS

PCT/EP2016/001271, International Search Report (PCT/ISA/210) dated Nov. 2, 2016, with partial English translation, enclosing Written Opinion of the International Searching Authority (PCT/ISA/237) (Eleven (11) pages).
German Office Action issued in German counterpart application No. 10 2015 015 721.3 dated Apr. 22, 2016 (Seven (7) pages).

\* cited by examiner

VEHICLE WHEEL FOR A VEHICLE

BACKGROUND AND SUMMARY OF THE INVENTION

The subject matter of the invention relates to a vehicle wheel for a vehicle.

DE 101 61 869 A1 shows a vehicle wheel having a plurality of spokes, lamellae, blades or similar, which are arranged on an outer side of the vehicle wheel and connect a rim base to a slide element. Between the spokes, lamellae, blades or similar, openings or spaces are provided which can be covered or closed as a result of a movement of the vehicle wheel. A centrifugally-controlled kinematic system is provided for this purpose, by means of which corresponding cover elements or mass elements are moveable.

Furthermore, it is known that a vehicle wheel having a strong three-dimensional design and strong "cupping" gives a vehicle a powerful athletic appearance. The term "cupping" in the context of a vehicle or a wheel rim is understood to mean that on the outer side, at least in the central region near the hub, a recess, depression, indentation or similar is provided, wherein this shape can be formed, for example, by several spokes, lamellae or blade elements or similar.

At high speeds, however, air resistance contributes significantly to fuel consumption. Here, a strongly cupped vehicle wheel has considerable disadvantages with regards to air resistance.

EP 1 319 526 A2 shows a vehicle wheel which comprises a rim and a hub provided in the central region, wherein the rim and hub are connected to each other by means of spokes which are arranged distributed over the circumference. Openings are provided between the spokes, which openings can be at least partially covered by means of a slide element that is arranged on an outer side of the vehicle wheel and is formed to be similar to a disc-shaped hub cap. For this purpose, the slide element is shiftable outwards in the direction of the wheel axis of rotation from an inner position in which the openings are covered into an outer position in which a gap is created between the disc-shaped slide element and the vehicle wheel via which a cooling air flow from a vehicle brake reaches the outside. By means of this slide element, the outer appearance of the vehicle wheel, in particular the cupping of the vehicle wheel, is hardly changed regardless of the vehicle speed.

The object of the invention is thus to create a vehicle wheel of the aforementioned type, which has improved aerodynamic properties at high speeds with a strong cupping at low speeds.

In order to create a vehicle wheel of the aforementioned type, which has improved aerodynamic properties at high speeds with a strong cupping at low speeds, it is provided according to the invention that at least some of the spokes, lamellae, blades, wheel segments or similar are hinged to the slide element and adjustable together with the slide element which is axially shiftable in the direction of the axis of rotation of the vehicle wheel. In the inner position, the distance of the slide element from a longitudinal central axis of the vehicle is smaller than in the outer position. The displacement of the slide element is therefore carried out depending on speed in the vehicle transverse direction and thus also in the radial direction relative to the vehicle longitudinal central axis.

The hinging of the spokes, lamellae, blades, wheel segments or similar on the slide element results in the spokes, lamellae or similar being positioned or displayed during the outward displacement of the slide element, which leads to a reduction in the cupping of the vehicle wheel. This produces an especially simple and effective opportunity to improve the flow resistance of the vehicle wheel on its outer side.

In an especially advantageous embodiment of the vehicle wheel, it is provided that at least some of the spokes, lamellae, blades, wheel segments or similar are pivotably mounted on an axis (a) which is fixedly arranged on the vehicle wheel. The spokes, lamellae, blades, wheel segments or similar are therefore placed outwardly during adjustment of the central slide element and thus pivot around the axis (a) of their respective outer support point, such that they occupy an overall substantially perpendicular placement when the slide element is arranged in an outer position, in which position the vehicle wheel has no or only a low cupping on its outer side. In this placement, the spokes, lamellae, blades, wheel segments or similar are therefore at least substantially aligned in the vertical direction (Z direction) of the vehicle and thus perpendicular to the road.

It is therefore provided according to the invention that the vehicle wheel is equipped with a mobile, in particular translationally displaceable, slide element. Preferably, this slide element is shiftably mounted in the direction of or parallel to the axis of rotation of the vehicle wheel. The axis of rotation of the vehicle wheel and the longitudinal central axis of the slide element are preferably aligned with each another or are coincident. In this case, the slide element is therefore arranged concentrically to the vehicle wheel axis of rotation or is shiftable coaxially to this axis.

In a preferred embodiment of the vehicle wheel, it is provided that a corresponding kinematic system is provided on the vehicle wheel for this purpose, such that the slide element of the vehicle wheel is outwardly shiftable from a first position in which the rim has a correspondingly large cupping into a second position, in order to at least reduce the cupping of the rim or alternatively to fully remove it. A vehicle wheel which is aerodynamically adapting and thus actively optimizable during vehicle operation is hereby created.

In a further embodiment of the invention, the kinematic system comprises at least one centrifugal force actuator, by means of which the central slide element is adjustable between the inner position and the outer position. The activation of the displacement movement of the slide element and the forces required for this thus result from the centrifugal forces of the at least one centrifugal force actuator. In this respect, it has been found to be advantageous when an automatic adjustment of the slide element from the inner position in the direction of the outer position is carried out at a correspondingly high peripheral speed of the vehicle wheel. By using centrifugal force for activation and adjustment of the slide element provided on the vehicle wheel, the system is thus independent of electricity and electronics. Active actuators, control devices, radio devices and the like can thus be avoided when there is centrifugal force control. Use independent of vehicle size, series and type is possible. The adjustment of the activation speed is preferably carried out via the lever lengths or the size of the mass. It should, however, be noted that a system comprising an active actuator or similar could also be used, alternatively or in addition to the use of centrifugal force.

In a further advantageous embodiment of the invention, the kinematic system comprises at least one return element, in particular at least one return spring, by means of which the slide element can be automatically returned between the outer position and the inner position. This therefore also produces a system which is independent of electricity and electronics. The slide element thus preferably automatically returns from the outer position in the direction of the inner position when the peripheral speed of the vehicle wheel falls below a specified level.

A further preferred embodiment of the invention is characterized in that the spokes, lamellae, blades, wheel segments or similar can be folded from the slide element around an axis of rotation in the vicinity of a rim flange. It is thus possible, for example, for the spokes, lamellae, blades, wheel segments or similar to be folded outwards flush to the wheel scythe, whereby the cupping is reduced and a virtually flat vehicle wheel having an aerodynamically optimized contour is produced.

If, in a further embodiment of the invention, the spokes, lamellae, blades, wheel segments or similar are received by a carrier wheel, a separate component is thus created which, for example, can be attached to spokes of the vehicle wheel and/or its rim. A virtually flat vehicle wheel having an aerodynamically optimized contour can thus be achieved by the reduction in cupping. The system according to the invention can therefore be both part of the vehicle wheel itself and a separate device, which can subsequently be attached—in the manner of a hub cap—to the vehicle wheel.

Finally, it has been shown to be advantageous when the wheel segments are formed as surface elements between the spokes, lamellae, blades or similar. These surface elements, which, for example, each cover the free space between two adjacently arranged wheel segments, together with the spokes, lamellae, blades or similar, enable a flat shape of the vehicle wheel on the outer side, similar to a disc wheel.

Further details of the invention arise from the following description of preferred exemplary embodiments and with the aid of the drawings.

DETAILED DESCRIPTION OF THE DRAWINGS

Figure 1:
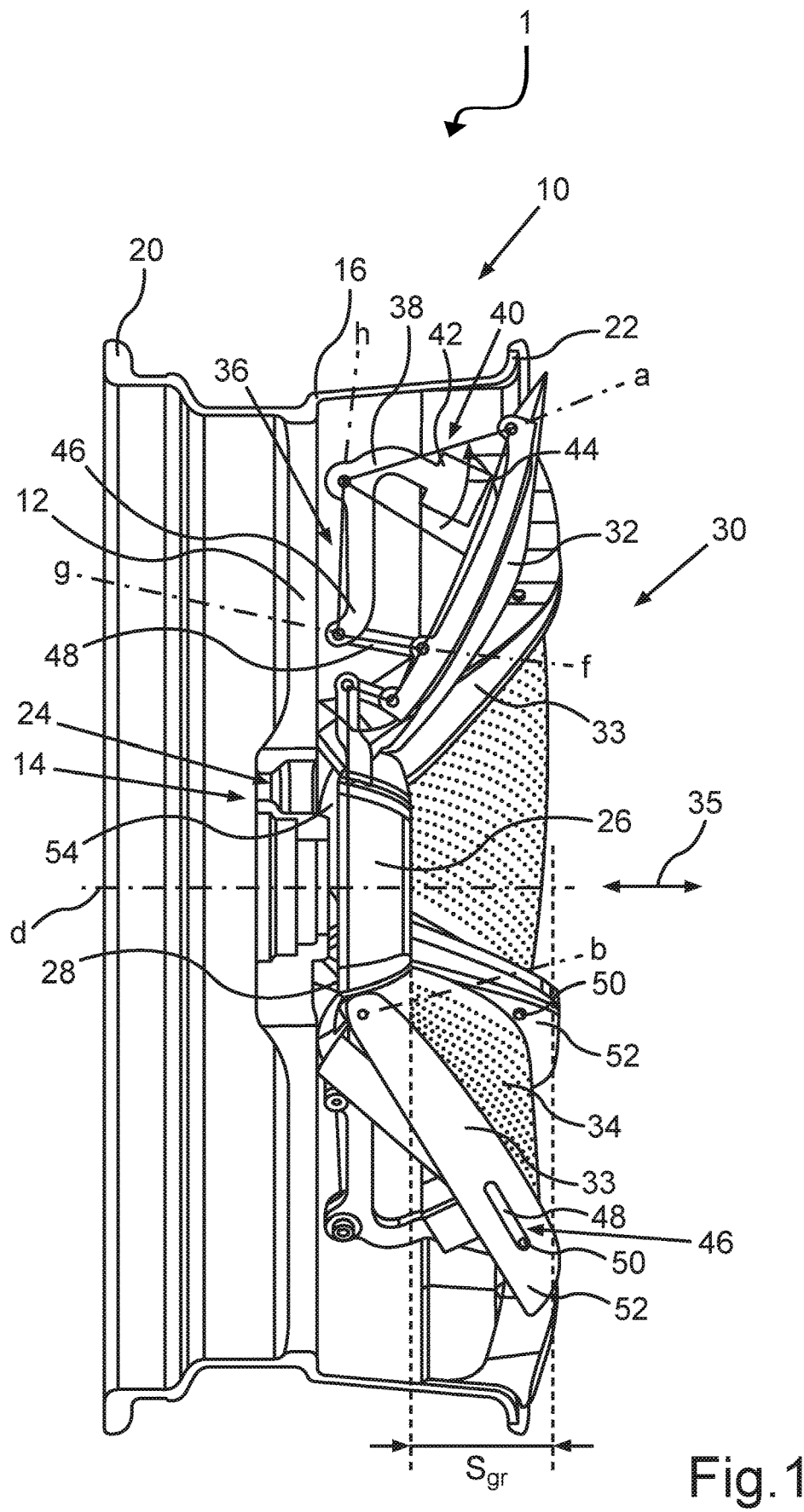
FIG. 1 is a sectional depiction of an exemplary embodiment of the vehicle wheel according to the invention having an axially shiftable slide element, here arranged in an inner position, which is shiftable in the direction of the axis of rotation of the vehicle wheel by means of a suitable kinematic system having a mass weight, in order to change the cupping of the vehicle wheel.
Figure 2:
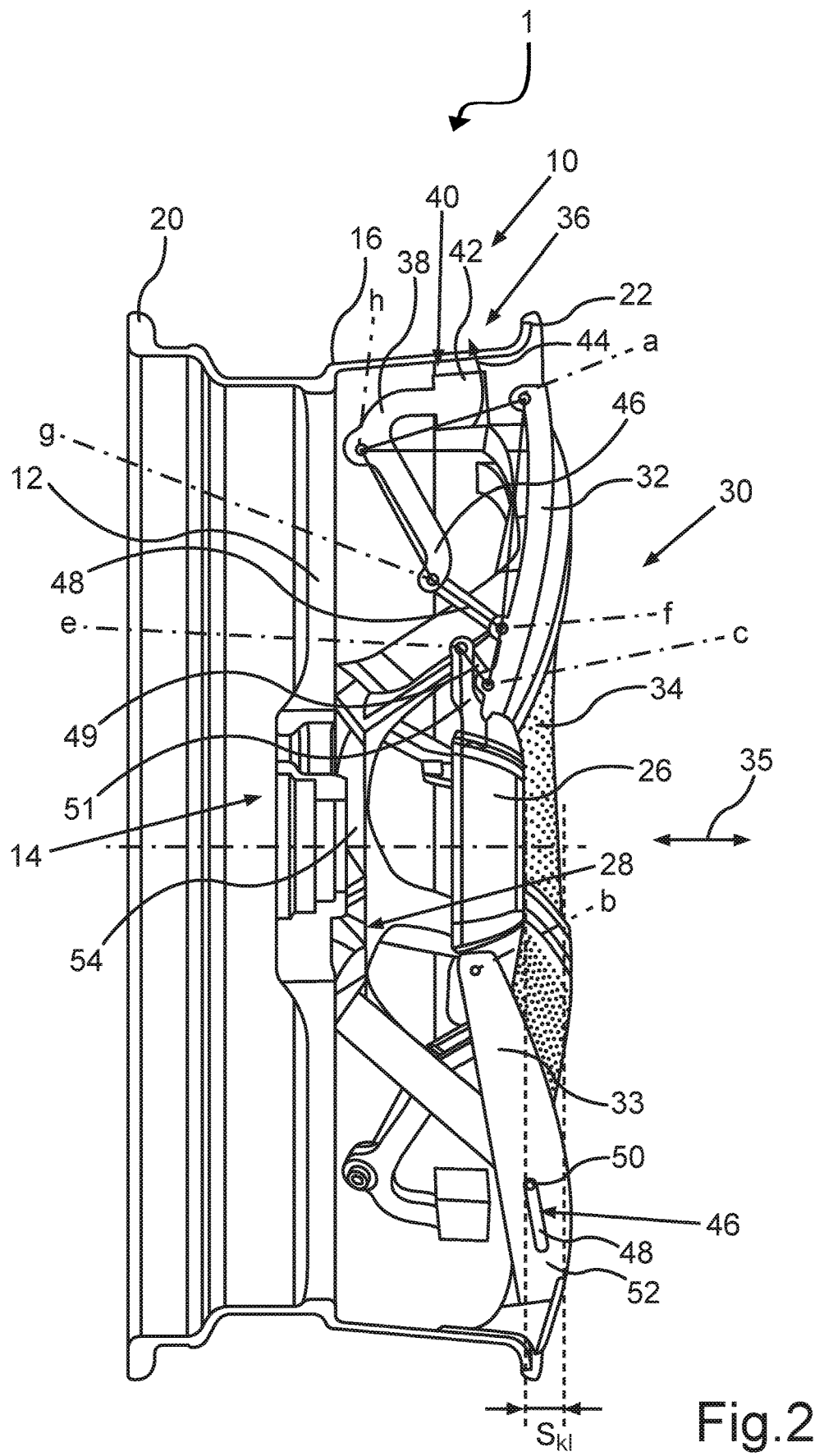
FIG. 2 is a sectional depiction of the exemplary embodiment of the vehicle wheel according to FIG. 1, in which the slide element is axially shifted into the outer position by means of a kinematic system, whereby the cupping of the vehicle wheel is reduced.
Figure 3:
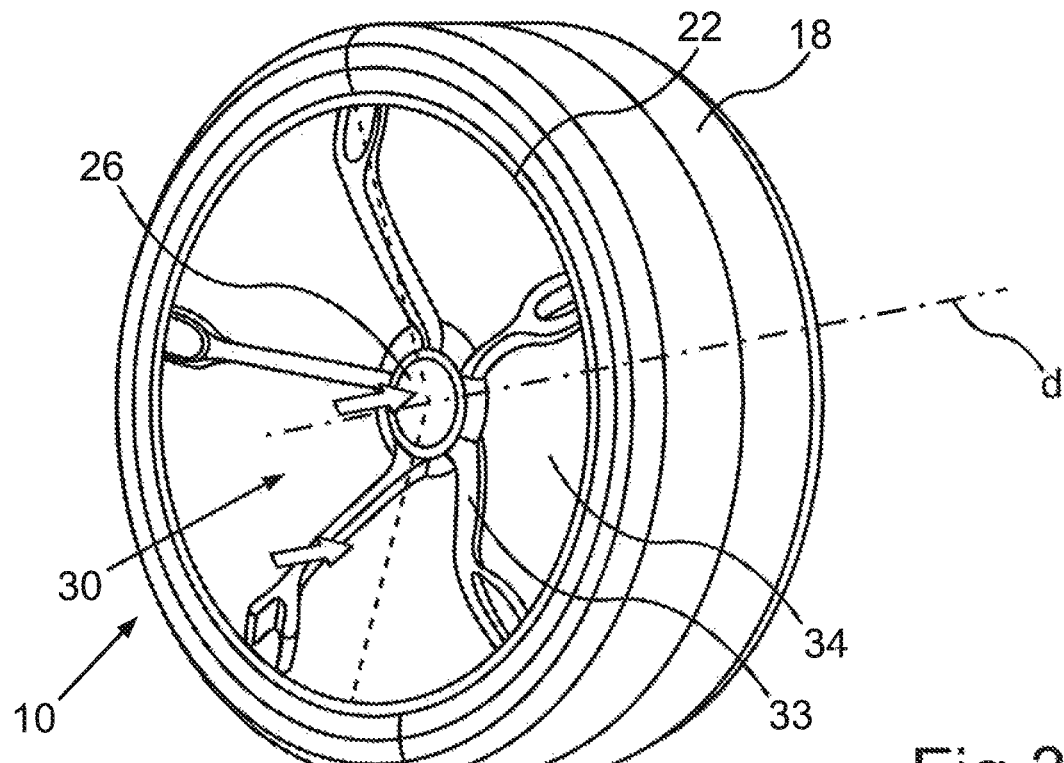
FIG. 3 is a perspective depiction of a further exemplary embodiment of the vehicle wheel according to the invention for a vehicle having an axially shiftable slide element, here once again arranged in an inner position, which is axially shiftable outwards in the direction of an axis of rotation of the vehicle wheel by means of a kinematic system.
Figure 4:
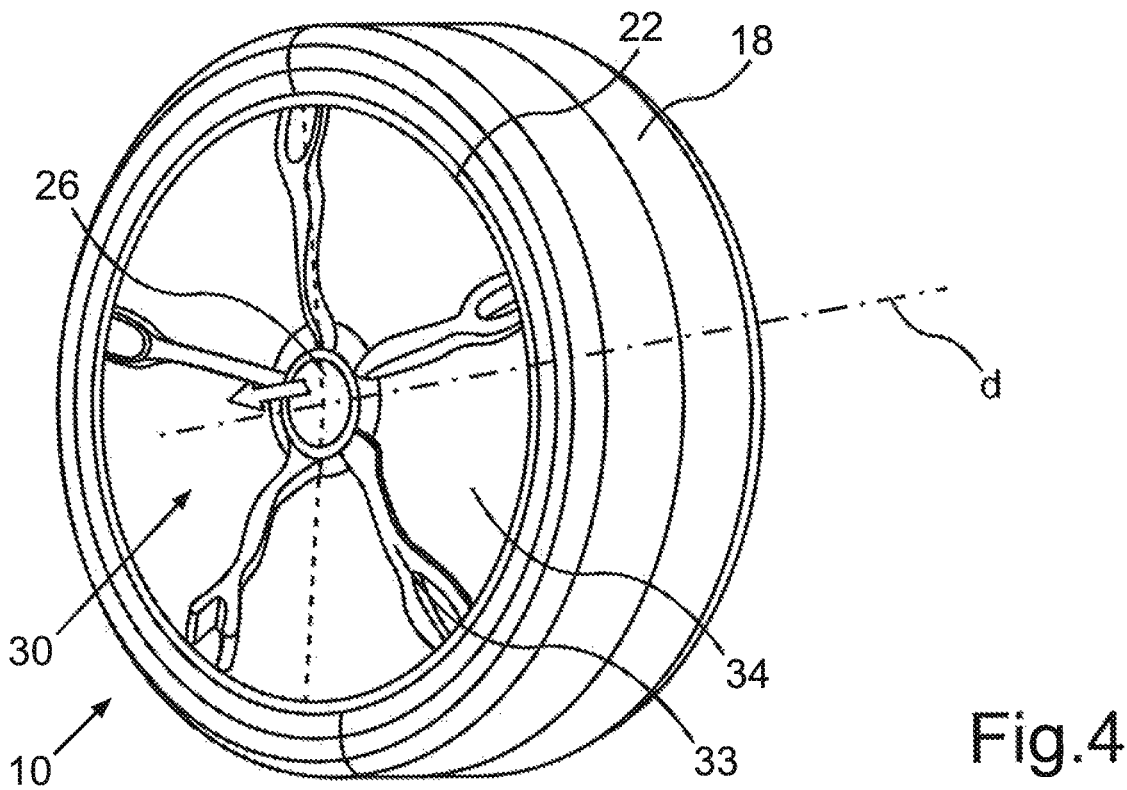
FIG. 4 is a perspective depiction of the exemplary embodiment of the vehicle wheel according to FIG. 3, in which the slide element is axially shifted into the outer position by means of the kinematic system, whereby the vehicle wheel has only a low cupping.

In FIGS. 1 and 2, in each case, a vehicle wheel 1 for a passenger vehicle is shown in a sectional depiction along its central longitudinal axis or axis of rotation (d) according to a first exemplary embodiment and, in FIGS. 3 and 4, in each case, in a perspective depiction according to a further exemplary embodiment. However, both exemplary embodiments will be described together hereinafter due to their substantially similar design. The same parts are provided with the same reference numerals, such that reference can be made to the preceding description in this respect.

The vehicle wheel 1 comprises a rim 10 and a hub 14 which is provided in the central region, which are connected to each other by means of a carrier element 12, here formed in the shape of a disc. The carrier element 12 has several openings, whereby spokes, so to speak, are formed, which connect the rim 10 and the hub 14 to each other. Rim 10, hub 14 and carrier element 12 are here connected to one another or formed in one piece. The axis of rotation of the vehicle wheel 1 in the vehicle-mounted state is marked with the reference character "d".

The vehicle wheel 1 can be produced from light metal, in particular an aluminum alloy, for example by means of a bulk deformation process such as forging, or alternatively from steel or similar. The vehicle wheel 1 according to the invention can also have a plurality of carrier elements 12 instead of the one carrier element 12 according to an embodiment not shown in the Figures, which can be formed, for example, as spokes, lamellae, blades, wheel segments or similar, which are preferably distributed over the wheel circumference spaced apart from one another.

The rim 10 comprises a rim bed 16 which is substantially U-shaped in cross-section for receiving a tire 18, shown only in FIGS. 3 and 4. The rim bed 16 is bordered by an inner rim flange 20 and outer rim flange 22, wherein "inner" and "outer" refer to the arrangement of the rim flange when the vehicle wheel 1 is mounted on the vehicle with respect to, for example, the vehicle longitudinal axis, that is, the distance from the "inner rim flange 20" to the longitudinal central axis of the vehicle is smaller than that of the "outer rim flange 22".

In the region of the hub 14 or in its transition region to the carrier element 12, one of a plurality of screw holes 24 which are evenly distributed along a hole circle can be seen, by means of which the vehicle wheel 1 can be fastened to a wheel carrier of a vehicle axis by means of respective screws. Wheel carrier generally refers to the part of the wheel suspension that receives the wheel hub 14 and thus the vehicle wheel 1.

In FIGS. 1 and 3, the vehicle wheel 1 is depicted in an initial position or a cupped, in particular strongly cupped state, in which an axially shiftable slide element 26 is arranged in its inner position, in which this element has its smallest distance from the longitudinal central axis (Y=0) of the vehicle. In this placement the slide element 26 abuts on a stop surface 28 on the outer side in the region of the hub 14 or in the transition region between the hub 14 and the carrier element 12 of the vehicle wheel 1. In this position of the slide element 26, the vehicle wheel 1 has a correspondingly large cupping $S_{gr}$ on its outer side 30. In the present case, this means that pivotably mounted spokes 33 run obliquely inward in the axial direction of the axis of rotation (d) on the slide element 26 which is attached adjustably, in particular shiftably, in the direction of the axis of rotation (d) of the vehicle wheel 1, for example in a manner described in more detail later, such that a correspondingly large recess on the vehicle wheel 1 is produced overall on the end face on the outer side 30.

Here, the slide element 26 is at least substantially rotationally symmetrically formed, wherein its longitudinal central axis is arranged coaxially to the axis of rotation (d) of the vehicle wheel 1. That is, the slide element 26 is arranged in the central region of the vehicle wheel and rotates around the same axis as the vehicle wheel 1. In a preferred embodiment of the vehicle wheel 1, it is provided that the slide element 26 is guided in the direction of its displacement direction, i.e., here along the axis of rotation (d) of the vehicle wheel 1, which is achievable, for example, by means of a guide element provided on the vehicle wheel 1 and not depicted in the Figures, which interacts with the slide element 26. This guide element can be formed, for example, as an elongated element which engages in a corresponding guide receptacle in the slide element 26. For this purpose, the slide element 26 may also be designed in the form of a sheath.

As already explained, in the context of the vehicle wheel 1, cupping S should be understood to mean that a recess, depression, indentation or similar is provided on the outside, at least in the central region near the hub, wherein this shape can be formed, for example, by several spokes 33, lamellae, blades and/or flat elements or similar. In the present exemplary embodiment depicted in FIGS. 1 to 4, surface elements labelled below as wheel segments 34 are provided, which respectively cover the free space between two adjacently arranged spokes 33. These thus form a correspondingly large recess on the end side of the vehicle wheel 1, i.e., the cupping S, with the spokes 33. The arrangement and design of the wheel segments 34 is chosen here in such a way that an overall closed outer surface of the vehicle wheel 1 in the region of the so-called rim bowl is produced. In the exemplary embodiment of the vehicle wheel 1 depicted in the Figures, the wheel segments 34 each have—at least substantially—the shape of a circular cutout.

The large cupping $S_{gr}$ gives the vehicle a powerful athletic appearance, but has considerable disadvantages with regards to air resistance at high speeds. At slow speeds however, no such great claim of aerodynamics is made, or the flow around the vehicle wheel 1 and the wheel casings has less of an impact on the air resistance of the vehicle at that moment. The large cupping $S_{gr}$ is thus preferable at slow speeds, as this provides great opportunities for the shaping of the vehicle wheel or rim design.

In contrast, at a correspondingly high speed of the vehicle and thus an associated peripheral speed of the vehicle wheel 1, the spokes 33, and with these the respective circular segment-shaped wheel segments 34, are, in a centrifugally controlled manner—effected together with the slide element 26 which is shiftably arranged on the vehicle wheel 1—moved outwards from the inner position shown in FIGS. 1 and 3 in a manner which is further described in more detail, and maximally to its outer position which is shown in FIGS. 2 and 4, in which the cupping Skl of the vehicle wheel 1 is significantly smaller and preferably has a minimum. This displaceability of the slide element 26 is indicated in FIGS. 1 and 2 by a double arrow 35.

The arrangement and design of the spokes 33 and the wheel segments 34 in the outer position is chosen in such a way that it produces an overall closed outer side 30 of the vehicle wheel 1. Here, the further spokes 33 run between the wheel segments 34, the spokes 33 being hinged on the moveable slide element 26 via an associated axis (b). The surface elements 34 provided between the spokes 33, lamellae or similar, are thus brought into a flat position similar to a disc wheel, in which the vehicle wheel 1 has at least a reduced cupping (S). The at least virtually level shaping of the outer side 30 or hub/vehicle wheel surface thus has an optimized impact on the aerodynamics.

In order to achieve the centrifugally controlled and effected displacement of the slide element 26 between the inner and outer position together with the spokes 33 and the wheel segments 34 which are arranged in front of or between these, a kinematic system 36 is provided in the present case.

In the context of the present invention, the term "kinematic system" is understood to mean a mechanism which is formed in such a way that the above-mentioned displacement of parts of the vehicle wheel 1 results in a targeted change or adjustment of the cupping of the vehicle wheel 1. In an especially advantageous exemplary embodiment of the vehicle wheel 1, it is provided that the kinematic system 36 is a purely mechanical mechanism. According to another embodiment variant of the vehicle wheel 1, as well as mechanical parts, the kinematic system 36 can also have pneumatic, hydraulic or electric components for realizing the desired adjustment of parts of the vehicle wheel for influencing the air resistance.

The activation of the displacement movement of the slide element 26 and the forces required for this thus result from the centrifugal forces of several mass weights 42 on the vehicle wheel 1 that are further described in more detail below, which are transferred by the kinematic system 36 by a central guide (balance of forces and centering) to the slide element 26. The slide element 26 thus withdraws from the stop surface 28 and shifts outwards coaxially to the axis of rotation (d) of the vehicle wheel.

Adjusting levers 32 which are not visible from outside as part of the kinematic system 36 are thus displaceable on a respective pivot axis (a) which is arranged in the vicinity of the outer rim flange 22. This is carried out by means of a respectively assigned angular control lever 38 which is pivotable around a respective lever axis (h) arranged near the carrier element 12. The associated mass weight 42 is thus arranged on the outer end 40 of the control lever 38, the mass weight being displaced outwards around the lever axis (h)—following centrifugal force—in the direction of a respective arrow 44 shown in FIGS. 1 and 2 with increasing rotational or peripheral speed of the vehicle wheel 1.

The displacement of the mass weight 42 results in a pivot of the control lever 38, visible when FIGS. 1 and 2 are viewed together, which results, in turn, in a movement in an outward direction of a push lever 48 connected at one end 46 to the control lever 38 in the region of a joint (g). As the push lever 48 is connected to the assigned control lever 32 on the opposite outer end via a joint (f), this lever is moved correspondingly with its inner end region in an outward direction, in order to reduce the cupping (S) or, if necessary, to fully eliminate it. Along with this, the flat wheel segments 34 are also pivoted outwards with their inner region, namely around the axis (a) of the respective push lever 32 which is arranged behind the wheel segment 34 and connected to it. Likewise, the slide element 26 is shifted outwards by a respective lever 49 which is hinged on the inner end of the respective spoke in the region of a joint (c), which is hinged to a respective, radially sloping lever arm 51 of the slide element 26 via a joint (e). By outward displacement of the respective push lever 32 with its inner end, a shift or displacement of the slide element 26 is therefore also achieved. By displacement of the slide element 26 or the wheel segments 34, the spokes 33 arranged therebetween are necessarily also displaced. Or, in other words, the spokes 33, lamellae or similar which are likewise integrated in the kinematic system 36 is displaced outwards—as viewed in the transverse direction of the vehicle—by a shift of the slide element 26 with its ends that face the slide element together with the slide element 26.

In FIG. 2, the mobile spokes 33, which are preferably hinged at the end on the axially shiftable slide element 26, are therefore also in a position in which the vehicle wheel 1 has only a low cupping (S), i.e., the recess on the outer side of the vehicle wheel 1 is significantly less pronounced compared to the initial position according to FIG. 1, which is especially advantageous with regards to the flow resistance of the vehicle wheel 1. This is made possible by a respective pivot-push bearing 46 of the respective spoke 33 on its outer end, which is formed by a slot 48 on sides of the spoke 33 and a bolt element 50 engaging in this slot, the bolt element 50 extending between two respective spoke arms 52 which laterally abut on the spoke 33. As these spoke arms 52 are fixed relative to the vehicle wheel 1, the spoke 33 in the region of the pivot push bearing 46 can thus be displaced relative to the spoke arms 52.

The spoke arms 52—as can be seen in FIG. 2—run with the respective inner ends up to a support element 54, which is supported or held on the outer side of the hub 14 of the vehicle wheel 1. The slide element 26 abuts on this support element 54 in the inner position. On the outer side, the spoke arms 52 are held on a carrier wheel. Here, the spoke arms 52, the support element 54 and the carrier wheel are designed in one piece in the present case. The visible segments including the spokes 33 are accordingly received by the carrier wheel. This results in a virtually flat vehicle wheel 1 having an aerodynamically favorable, improved contour. Here, the carrier wheel can be part of the vehicle wheel 1 or, alternatively, a separate element in the manner of a hub cap which is attached to the vehicle wheel 1. This produces a simple retrofit solution.

If the speed of the vehicle is reduced, the slide element 26 automatically returns from the outer position depicted in FIGS. 2 and 4 in the direction of its inner position depicted in FIGS. 1 and 3, by means of at least one return element which is not visible, in particular a return spring, when the peripheral speed of the vehicle wheel 1 falls below a specified level. A "neutral position", namely the inner position according to FIGS. 1 and 3 of the aerodynamic system having the displaceable slide element 26, the spokes 33 or similar and wheel segments 34 which are provided if necessary having a large cupping (S) is thus ensured at low speeds.

To summarize, it should be noted that, at high speeds and with the associated fast wheel rotation, a strong cupping (S) of the vehicle wheel 1 is subjectively not so strongly perceived. At high speeds, the wheel segments 34, including the spokes 33 which are preferably visible from outside, are therefore folded flush with the wheel scythe outwards from the slide element 26 around the pivot axis (a) which is in the vicinity of the rim flange 22 via the centrifugal force actuator or mass weights 42, whereby the cupping (S) is reduced. The activation of the displacement movement of the slide element 26 and the forces necessary for this thus result from the centrifugal forces of the at least one mass weight 42.

The invention claimed is:

1. A vehicle wheel for a vehicle, comprising:
   a plurality of components which are disposed on an outer side of the vehicle wheel;
   a kinematic system, wherein a contour of the outer side of the vehicle wheel is changeable by the kinematic system; and
   a slide element, wherein the slide element is shiftable between an inner position and an outer position in a direction of an axis of rotation of the vehicle wheel;
   wherein the plurality of components are hinged to the slide element and are adjustable together with the slide element.

2. The vehicle wheel according to claim 1, wherein the slide element is shiftable coaxially to the axis of rotation of the vehicle wheel.

3. The vehicle wheel according to claim 1, wherein the plurality of components are pivotably mounted on an axis which is fixedly disposed on the vehicle wheel.

4. The vehicle wheel according to claim 1, wherein the kinematic system comprises at least one centrifugal force actuator and wherein the slide element is shiftable between the inner position and the outer position by the at least one centrifugal force actuator.

5. The vehicle wheel according to claim 1, wherein when a peripheral speed of the vehicle wheel falls below a specified level, the slide element shifts automatically from the outer position in a direction of the inner position.

6. The vehicle wheel according to claim 1, wherein the plurality of components are foldable from the slide element around an axis in a vicinity of a rim flange.

7. The vehicle wheel according to claim 1, wherein the plurality of components include spokes, lamellae, blades, or wheel segments.

8. The vehicle wheel according to claim 1, wherein the plurality of components include spokes, lamellae, blades, and wheel segments and wherein the wheel segments are surface elements between the spokes, lamellae, or blades.

* * * * *